Sept. 11, 1962            J. E. GREEN            3,053,563
PORTABLE TRAILER
Filed June 6, 1960                                          6 Sheets-Sheet 1
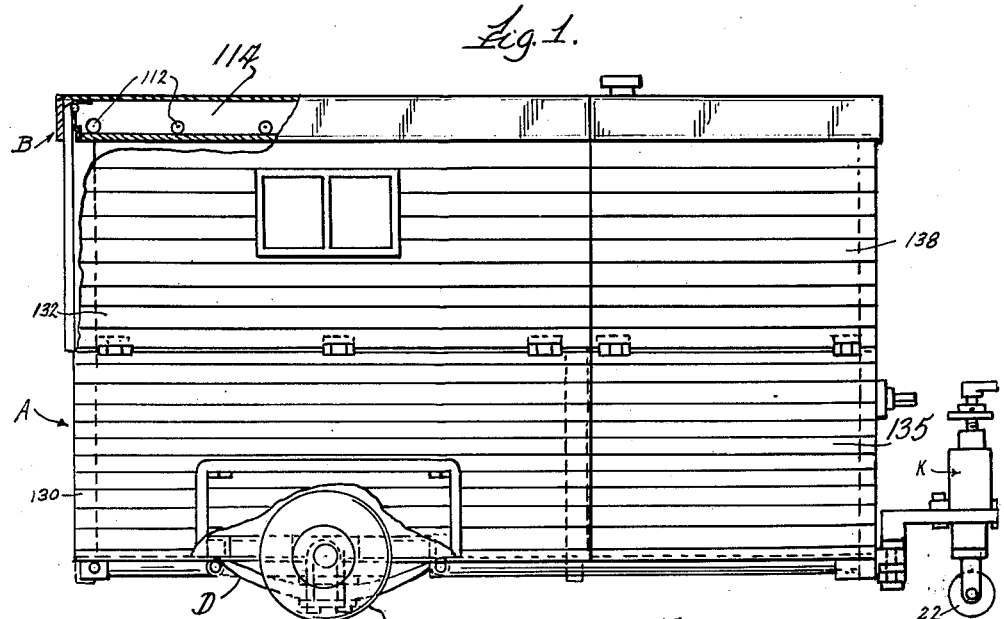
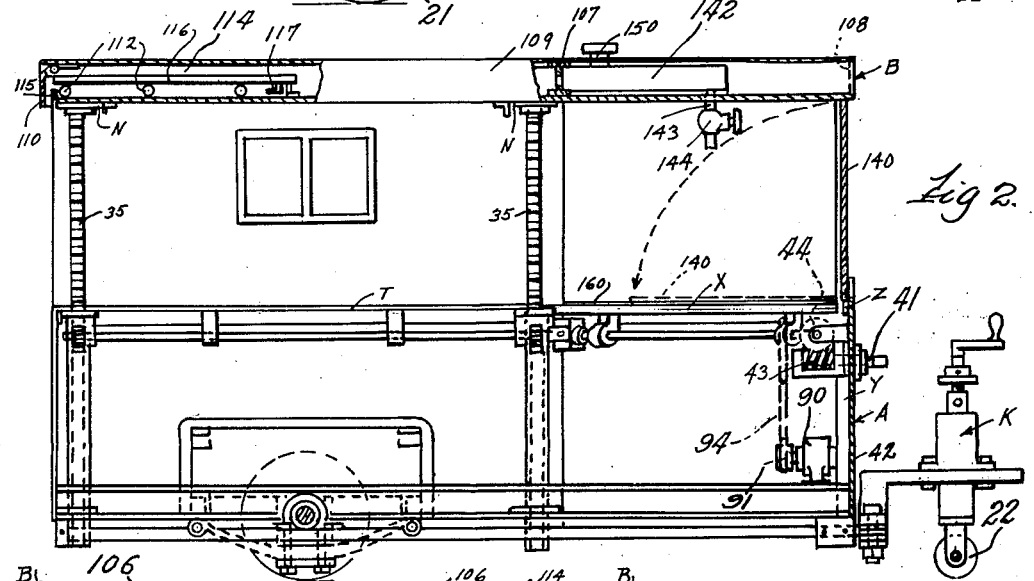
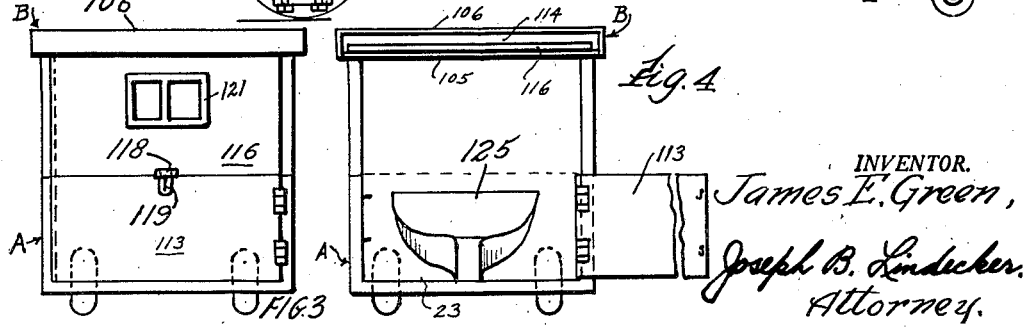
INVENTOR.
James E. Green,
Joseph B. Lindecker.
Attorney.

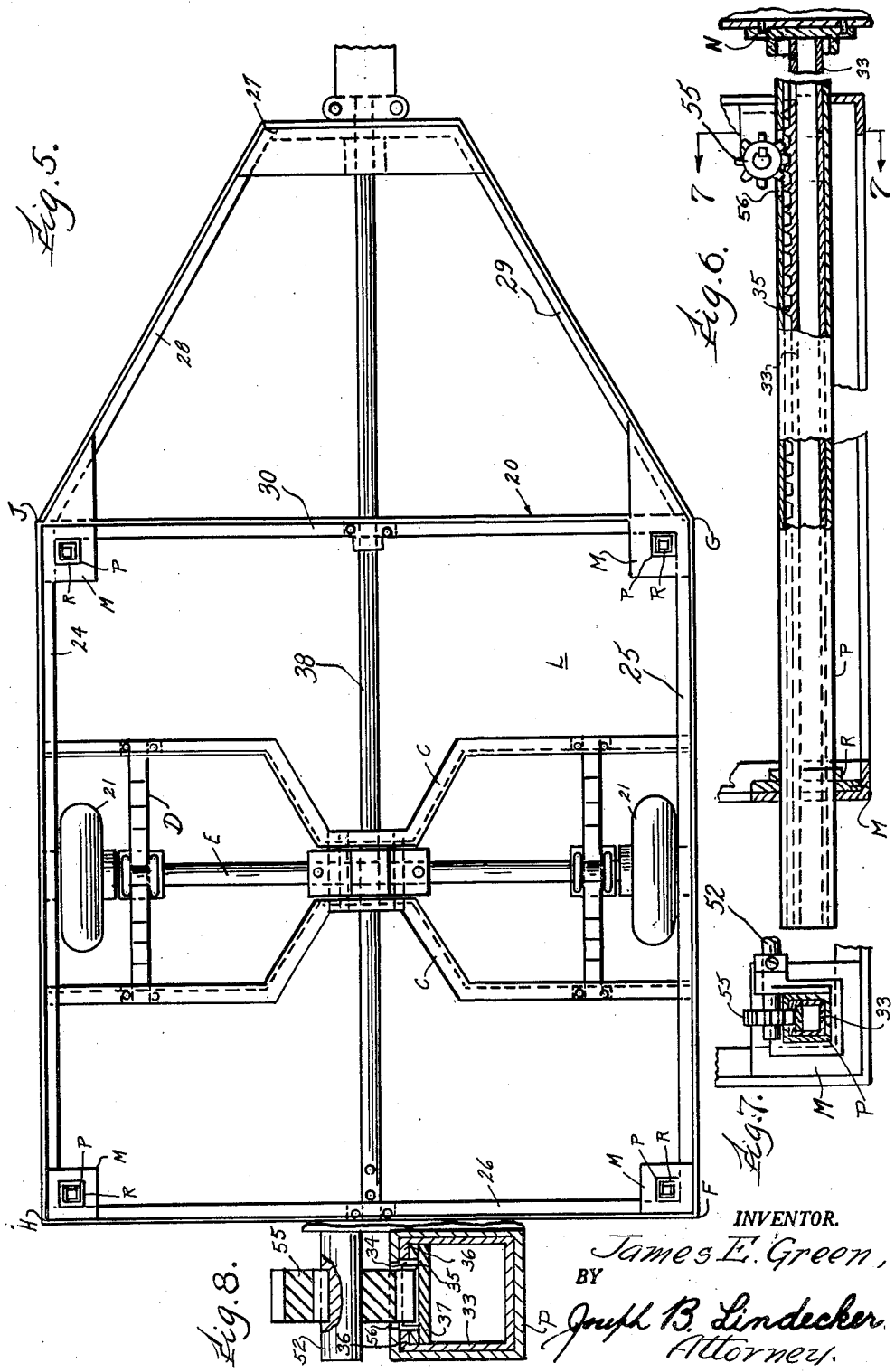

Sept. 11, 1962                 J. E. GREEN                3,053,563
                            PORTABLE TRAILER
Filed June 6, 1960                                    6 Sheets-Sheet 3
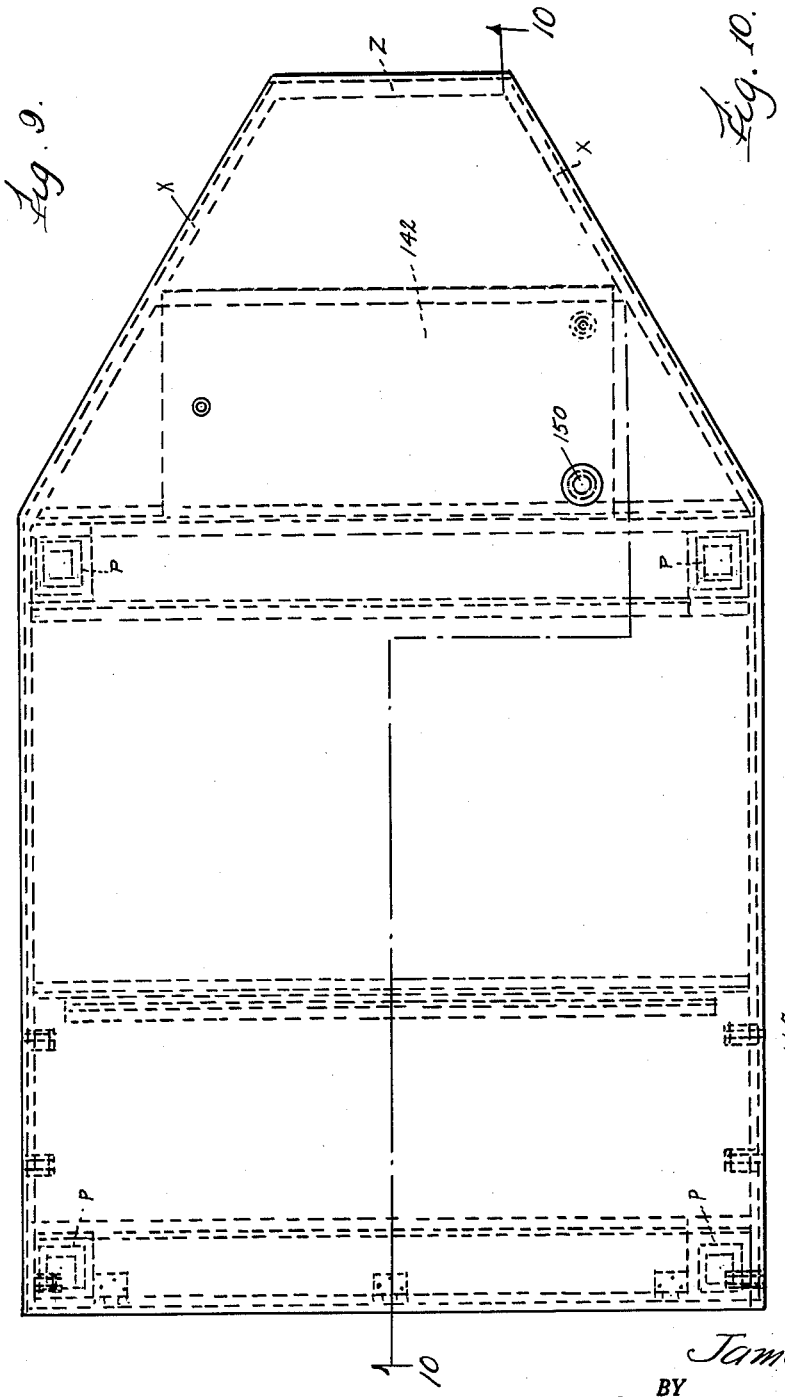
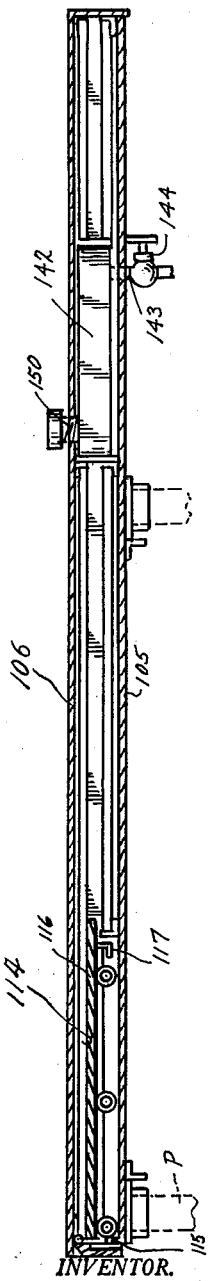
INVENTOR.
*James E. Green*
BY *Joseph B. Lindecker*
*Attorney.*

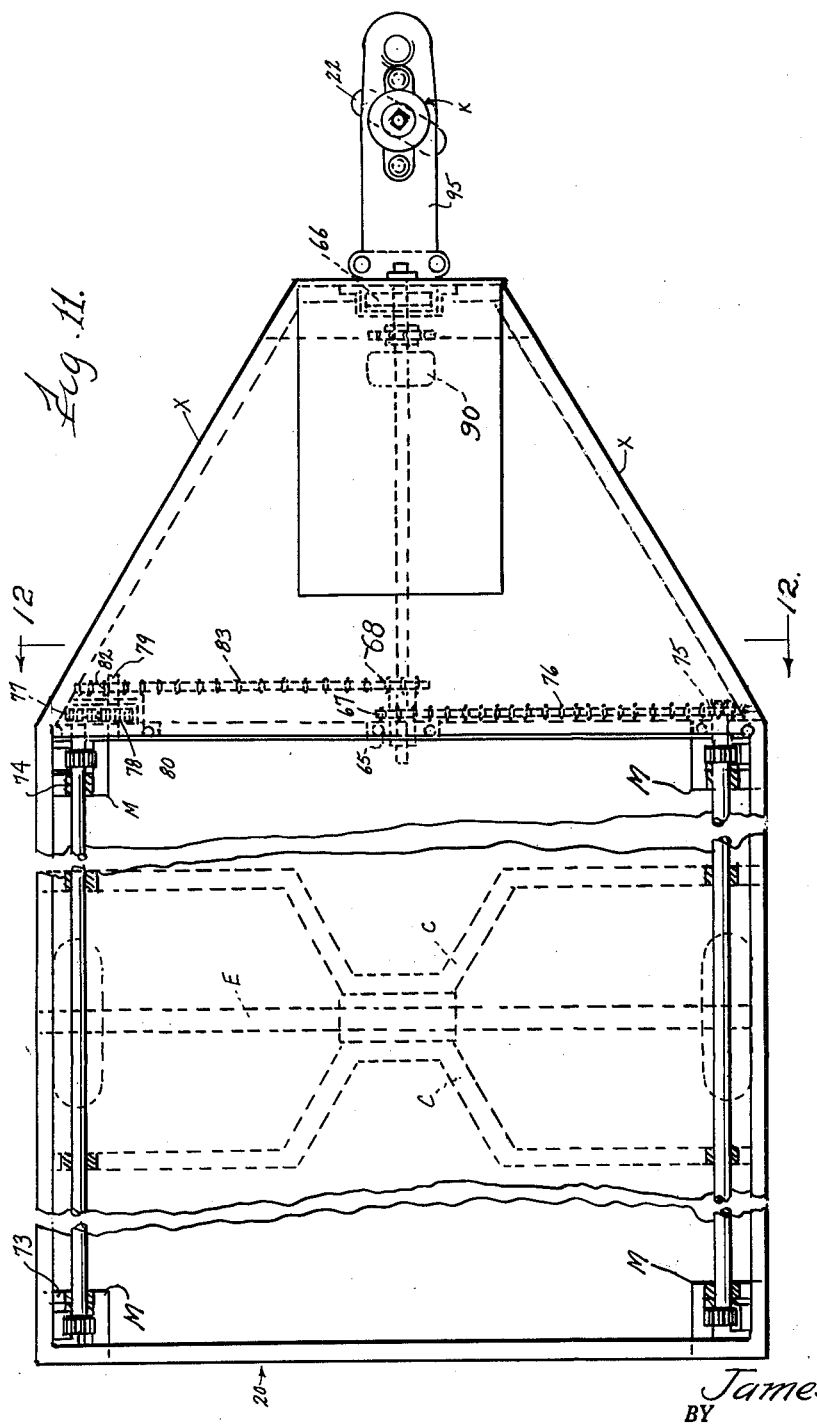

Sept. 11, 1962     J. E. GREEN     3,053,563
PORTABLE TRAILER
Filed June 6, 1960     6 Sheets-Sheet 5
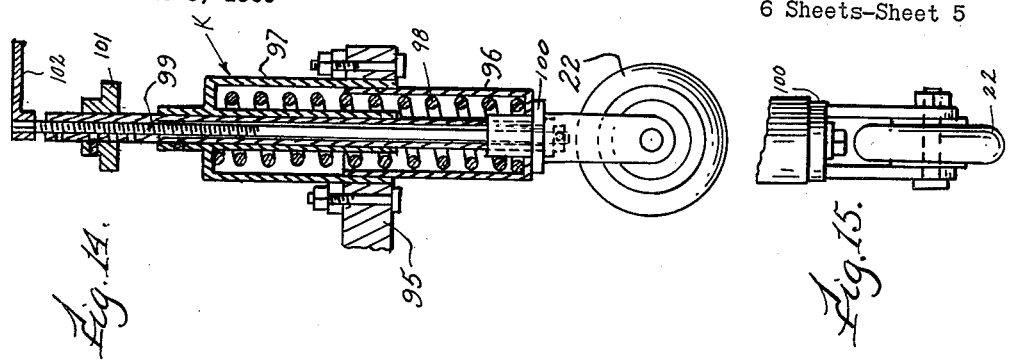
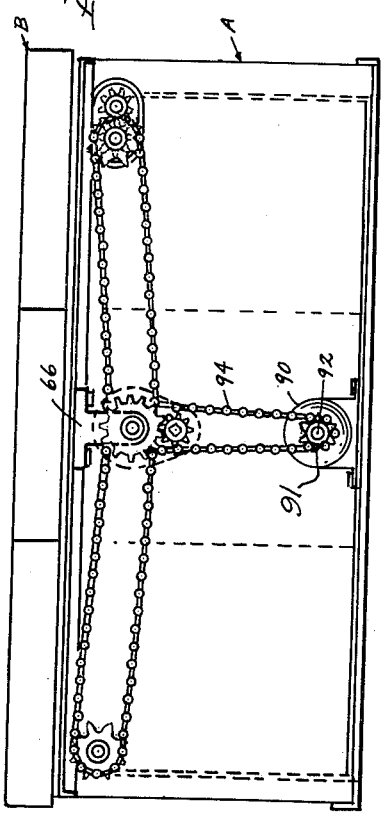
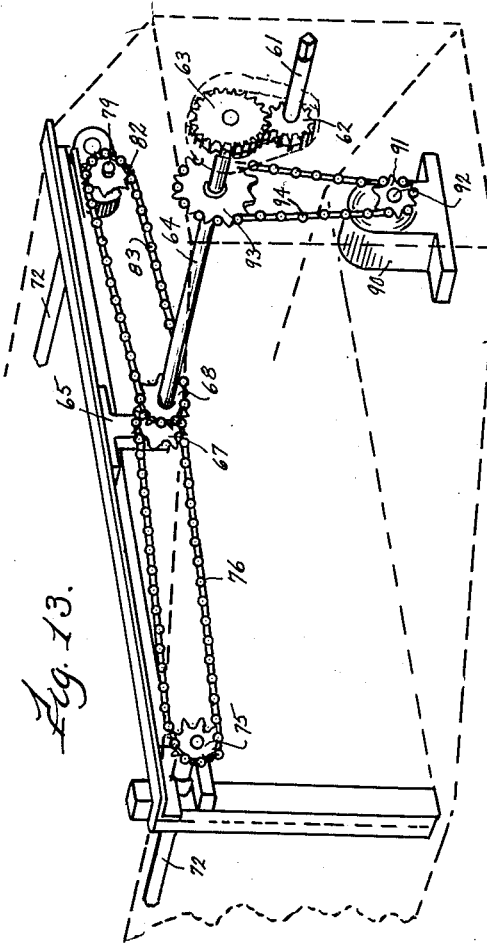
INVENTOR.
James E. Green
BY
Joseph B. Lindecker.
Attorney.

Sept. 11, 1962  J. E. GREEN  3,053,563
PORTABLE TRAILER
Filed June 6, 1960  6 Sheets—Sheet 6
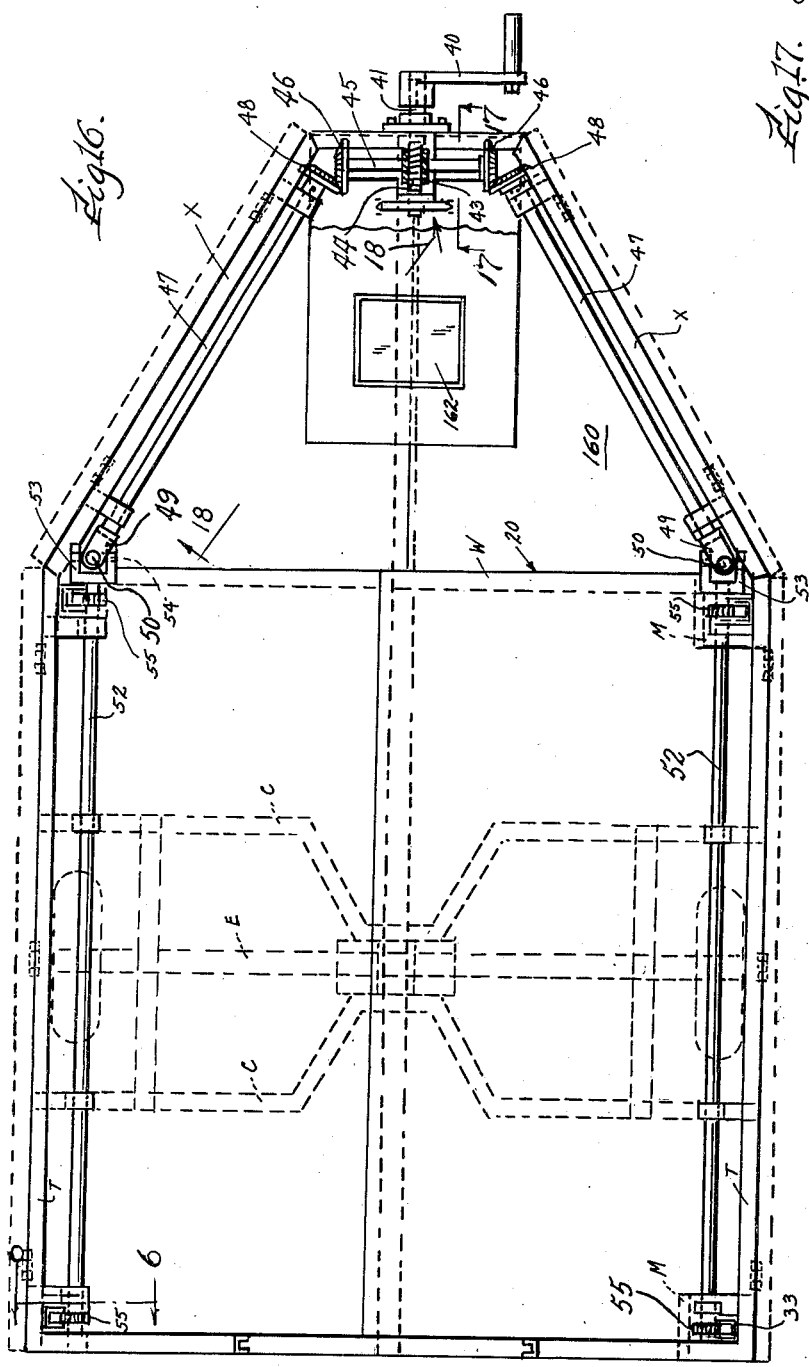
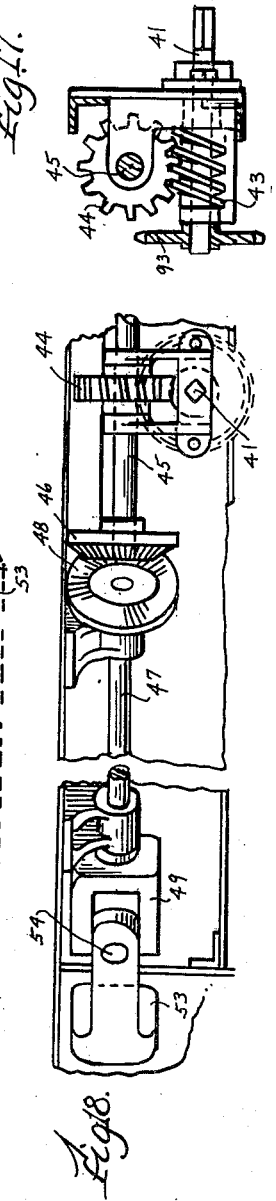
INVENTOR.
James E. Green,
BY Joseph B. Lindecker
Attorney.

United States Patent Office 3,053,563
Patented Sept. 11, 1962

3,053,563
PORTABLE TRAILER
James E. Green, 137 Hilltop Lane, Cassopolis, Mich.
Filed June 6, 1960, Ser. No. 34,259
1 Claim. (Cl. 296—27)

This invention relates generally to trailers adapted for attachment to motor and other vehicles, and more particularly to house trailers of the type which can also be employed for the transportation of a boat and other articles, the trailer having an adjustable roof structure whereby it can be raised or lowered so as to offer less resistance to the wind while moving when empty, or only partially loaded with a boat or the like.

A further object of this invention is to provide a sportman's trailer, so called because it embodies in a single movable vehicle of the trailer type means for housing the occupant and for transporting a boat, so that the user may upon reaching a lake, or camp site, remove the boat and set up housekeeping upon the shore by raising the trailer roof so that full head height will be afforded the occupant.

A still further object of this invention is to provide a portable trailer house that has a width substantially the same as the width of the towing automobile and which has the novel means for supporting tables, water supply tanks and other items of importance within the trailer house.

Still another object of this invention is to provide a trailer house that when in touring position will take no more head room than the height of the towing automobile; novel means being used for raising the trailer roof when the device is set up for camping and where full head height is desired; the trailer has an entrance at the rear, closed by two transverse doors, the lower door hinged to one side post of the trailer whereby a clear entrance is obtained from side to side, and while the upper door is movably secured at the top and completely removable from the opening by sliding it between the spaced apart roof and ceiling panel of the trailer. When the trailer is in touring position, the walls of the trailer being divided into upper and lower sections, the upper front wall section hinged at the bottom thereof is moved to a horizontal position within the trailer, the forward and side upper wall sections hinged at the bottom thereof adapted to be turned downwardly adjacent the exterior vertical surfaces of the lower wall sections and in parallel arrangement therewith.

And still another object is to provide a trailer adapted for attachment to an automobile, and which also carries adjacent and in front thereof, a spring mounted and adjustably supported swivel type caster wheel assembly which gives auxiliary support to the front end of the trailer rather than rely entirely upon the towing vehicle while in motion, and the assembly being adjustable to raise and remove the load from the towing vehicle.

These and other objects and advantages of the present invention will be fully apparent from the following description when taken in connection with the annexed drawings, in which:

FIGURE 1 is a side elevation of the trailer, shown in camping position with the roof raised and completely enclosed by elevated walls, and embodying the principles of the invention, some parts shown in section;

FIGURE 2 is a longitudinal vertical sectional view of the trailer shown by FIG. 1, some parts shown in full lines;

FIGURE 3 is a diagrammatic rear end elevational view of the trailer shown by FIGURE 1;

FIGURE 4 is a diagrammatic view similar to FIG. 3, the lower door being swung open exposing the rear end of a boat within the trailer, and the upper door being arranged and supported between the roof and the ceiling of the trailer;

FIGURE 5 is a plan view of the chassis of the trailer, showing the novel frame with the wheels and axle assembled therewith;

FIGURE 6 is a partial sectional view of one of the vertical hollow corner posts and the roof raising means assembled therewith, taken on line 6—6 of FIG. 16, the post shown horizontally;

FIGURE 7 is a detail sectional view taken on line 7—7 of FIG. 6;

FIGURE 8 is an enlarged sectional view taken transversely through the hollow post shown in FIG. 7;

FIGURE 9 is a top plan view of the trailer, some parts of the frame omitted and some parts of the frame and upper structure shown by dotted lines;

FIGURE 10 is a detail sectional view taken substantially on line 10—10 of FIG. 9;

FIGURE 11 is a plan view of the trailer, the roof completely removed to show the chain drive assembly by dotted lines;

FIGURE 12 is a vertical transverse view of the lower portion of the trailer as shown by FIG. 11, and taken on line 12—12 thereof;

FIGURE 13 is a diagrammatic perspective view of the chains and shafts and associated parts shown by FIG. 12;

FIGURE 14 is a sectional view of the single swivel wheel type dolly shown by FIGS. 1, 2 and 11;

FIGURE 15 is a fragmentary elevational view of the swivel wheel shown by FIG. 14;

FIGURE 16 shows a modified form of roof raising mechanism, replacing the chain drives shown specifically by FIGS. 11, 12 and 13;

FIGURE 17 is an enlarged sectional view taken on line 17—17 of FIG. 16; and

FIGURE 18 is a broken detail view of the bevel gears and shafting, taken on line 18—18 of FIG. 16.

Referring to the drawings, the numeral 20 designates generally a frame structure provided with a pair of rear wheels 21, a caster wheel 22 at the forward end of the frame, a trailer house that has a lower portion indicated generally at A and a vertically movable roof portion indicated generally at B. FIGURE 3 shows the lower portion A as having a width substantially equal to the width of an automobile, not shown, that is used for pulling the trailer. The lower portion A has a rear door opening 23 substantially equal to the rectangular shaped vertical rear end thereof. The desired frame 20 includes base angle irons that extend along the sides and ends of the same at its base forming side and end base rails. The frame 20 has parallel side rails 24 and 25, rear rail 26, front rail 27 substantially one-third the length of said rear rail 26, two forward diverging rails 28 and 29 connected between the forward ends of the side rails 24 and 25 and the ends of the front rail 27, and a transversely arranged cross rail 30 joining the forward ends of the side rails 24 and 25; the area between the cross rail 30, the front rail 27 and the two diverging rails 28 and 29 being trapezoidal. A pair of supporting rails "C" are arranged transversely between the rear rail 26 and cross rail 30 to which the springs "D" are longitudinally supported, the axle E arranged transversely of the frame 20 and secured to the intermediate portions of the springs "D," said wheels 21 being parallel at the ends of said axle "E." A longitudinal central base rail 28 extends from the mid-point of the rear rail 26 to the mid-point of the short front rail 27 and also secured to said transverse rails, forming a rigid base frame with four rigid square corners F, G, H, and J, at the opposite ends of the side rails 24 and 25, the purpose of said rigid square corners to be described later. The front rail 27 having an angular support member or hitch arranged and secured normal thereto for the mounting of the swivel wheel assembly "K."

A plurality of hollow posts "P" extend around the rectangular base floor portion L of the trailers. A perforated thrust plate "M" is horizontally arranged in each of the four corners of the floor portion "L," said plates "M" having upwardly extending flanges "R" forming a hollow pocket therein, substantially the same sizes as the transverse external dimensions of said posts "P." Similar plates N but non-perforated are secured to the underside of the roof portion "B," in direct vertical alignment above said four plates "M." Said hollow posts "P" are rigidly secured within the flanges "R" of said plates "M," and extend normal to said plates M. A top rail "T" extends between the posts from each rear corner post to the forward post in each side and connects the upper ends of the post together. A transverse rail "W" extends between the upper ends of the forward posts. A pair of channel support posts Y are arranged vertically at the ends of the front rail 27 and of the same height as said hollow posts P. Top rails "X" extend from the top of the hollow posts P to the top of the channel support posts "Y," and a rail "Z" extends between the tops of each of said support post "Y." Said rails T, W, X and Z combined with the vertical posts "P" and vertical channel supports "Y" form the skeleton frame of the lower portion "A" of the house trailer. The plates "N" attached to the underside of the roof portion "B" rest upon posts "P" when the roof is in its lowermost position, forming a solid structure.

Inside each hollow post "P" is arranged a hollow member designated generally by 33; the hollow extension member consists of an elongated square post closed on three sides and formed with internal flanges 36 on one side thereof, leaving an open slot 34 between the same and extending the entire length of the hollow extension member 33. An elongated flat plate 37, with a rack gear 35 welded on one side thereof, is welded to the inside of extension member 33, by welding the said plate 37 to the inside of flanges 36 whereby the rack gear 35 extends toward and adjacent said slot 34, said plate 37 and rack gear 35 closing the fourth side of said hollow extension member 33, as clearly shown by FIGURES 7 and 8. Said plates "N" attached to the underside of the roof portion "B" rest upon the upper ends of said hollow extension members 33 with plate 37 and rack gear 35 secured thereto when the roof is in an upper position above said posts "P." If desired, the entire roof section "B" can be easily removed from either the extension members 33, or the posts "P" should it be desired to use the trailer as an open top truck.

To raise and lower said hollow extension members 33 suitable shaft and gear means are employed. In FIG. 16 a hand crank 40 is provided and mounted on a short longitudinal extending shaft 41 extending through the front wall 42 of the lower section "A" of the trailer, said shaft 41 having a worm gear 43 in mesh with a gear 44 on a cross shaft 45, said shaft 45 mounted upon the transverse horizontal rail "Z." Bevel gears 46 are mounted upon the opposite ends of said cross shaft 45 adjacent the ends of said rail Z. A shaft 47 is horizontally journalled in brackets mounted on the inside surface of each of said top rails "X" extending angularly to said cross shaft 45, the forward ends of each shaft 47 having a bevel gear 48 in mesh with said bevel gears 46. The opposite ends of said shafts 47 are each provided with a yoke 49 with a pin 50 between the spaced arms thereof forming one part of a flexible coupling, such as a "Hooke's Joint." A shaft 52 is journalled in bearings within brackets mounted on the inside surface of each of said side top rails "T" extending longitudinally of the trailer. The forward end of said shafts 52 are provided with a yoke 53 and pin 54 forming the mating portion of the flexible coupling between said shafts and connected with yoke 49 and pin 50. Adjacent each end of said shafts 52 is mounted a pinion gear generally designated 55. The pinion gears are so mounted upon said shafts 52 as to be adjacent said hollow posts "P." The wall of each hollow post "P" adjacent the pinion gears 55 is provided with a vertical slot 56. This slot allows the pinion gear 55 to extend therethrough and also through slot 34 so that the gear teeth mesh with the rack teeth of the rack gear 35. A rotation of the crank 40 in the right direction will cause the shafts 45, 47 and 52 to rotate, this in turn will cause the pinion gears to rotate to lift the rack gears 35 shown in FIG. 2 and raise the roof portion "B" from touring position to camping position, shown by FIGURES 1, 2, 3 and 4. Turning the crank 40 in the opposite direction will lower the hollow extension members 33 with rack gears 35 welded thereto, allowing the plate "N" attached to the roof portion to settle and rest upon the upper ends of said posts "P." When said hollow extension members 33 are in the lowermost position, the lower ends thereof extend approximately through said thrust plates "M" inside said hollow posts "P," which extend approximately five inches below the perforated thrust plates "M," clearly shown by FIG. 6.

FIGURES 11, 12, and 13 show a modified form of roof raising means. A short longitudinal shaft 61 extends outside the forward end of the trailer section "A," the rear end of the shaft 61 having a spur gear 62 in mesh with a spur gear 63 which is mounted upon a longitudinal shaft 64 journalled in bearings within brackets 65 and 66 mounted with cross rail "Z" and transverse rail "W." Two sprockets 67 and 68 are mounted upon the rear end portion of shaft 64. A shaft 72 is journalled in brackets 73 and 74 mounted upon the top side rails "T," said shafts 72 having the same pinion gears 55 as described above and for the same purpose. The forward ends of said shafts 72 each have suitable means to rotate the same. The shaft 72 on the right side of the trailer has a sprocket 75 mounted thereon. An endless chain 76 travels around and between said sprockets 67 and 75, sprocket 67 driving said chain 76 which drives sprocket 75 and causes shaft 72 to rotate. The shaft on the left side of the trailer has a spur gear 77 mounted thereon. By suitable bracket and shaft means 80 a spur gear 78 is mounted adjacent and in mesh with said spur gear 77; the common shaft 79 which supports the spur gear 78 also supports a sprocket 82. An endless chain 83 travels over and around said sprockets 68 and 82, sprocket 68 driving said chain 83 which drives sprocket 82, which turns shaft 79, turning gear 78 in one direction and said gear 77 in the opposite direction which turns shaft 72 on the left side of the trailer in the same direction as the shaft 72 on the right side of the trailer, whenever the crank shaft 61 is rotated. When it is desired to raise the roof by power means instead of the shaft 61, by a crank 40, an electric motor 90 is arranged on the floor of the trailer adjacent the front end thereof, said motor having a sprocket 91 on its drive shaft 92. A sprocket 93 is assembled directly above said sprocket 91 and upon said shaft 64. An endless chain 94 travels around and between said sprockets 91 and 93, whereby said motor can drive said shaft in either direction when so controlled.

A caster wheel assembly is shown by FIGURES 14 and 15 mounted upon the hitch 95 disposed at the forward end of the frame 20, said hitch 95 adapted to be secured to a touring car. The small caster type auxiliary wheel 22 is mounted in conjunction with tubular telescoping members 96 and 97 with a coil spring 98 disposed therein, the resiliency of the coil spring being controlled by adjustable means consisting of a threaded shaft 99 therein rotatably secured to the thrust collar of the swivel caster wheel support 100. The lower cup-shaped member 96 encloses the bottom end of the coil spring 98, the inverted cup-shaped member 97 enclosing the top portion of the coil spring 98 and slides over the outside of member 96. The weight of the load will tend to compress the spring 98; however, a collar 101 is adjustably mounted above said member 97 to check any undue rebound due to upward movement of the hitch during traveling. By turning the crank 102 in clockwise direction, it will cause the collar 101 to be lowered. The construction and arrangement of parts is believed to be clearly shown by FIG. 14. The caster wheel assembly tends to act as an auxiliary load carrier during traveling and also to support the hitch in a horizontal position when the hitch is disengaged from the towing vehicle.

The roof portion "B" consists of a ceiling 105, a roof 106, suitable transverse spacing members 107 and 108 arranged at the forward end portion thereof, and side roof spacing walls 109 along both sides and around the front thereof. A transverse panel 110 is hingedly secured at the top thereof to the rear end of the roof 106 to close the opening at the rear of the cavity 114 existing between the roof and the ceiling. Three or more transverse rollers 112 are arranged close to the top surface of the ceiling 105 whereby the auxiliary rear door may be stored in the cavity 114 during traveling.

The rear end of the trailer has an unobstructed door opening 23 when the roof is in lowered position which is completely closed by a single door 113 hingedly secured at one end thereof to the rear structure of the trailer adjacent the hollow post 33 in and above corner F of the frame 20. When the roof is in raised position, leaving a second opening at the rear of the trailer, an auxiliary door 116 is withdrawn from cavity 114 where it is then suspended in a vertical manner by a hook-like transverse angle member 117 engaging a transverse rib 115 secured to the rear end of the ceiling 105. Suitable means, such as hooks, on the inside of the door 113 may be used to hold the door closed when so desired. The auxiliary door 116 has a hasp type fastening device 118 secured to the lower edge portion adapted to pass over a staple 119 whereby the upper door can be locked to the lower door by inserting a pin or padlock, or the like, therethrough. The auxiliary door 116 is provided with a window, or other suitable means 121, for ventilation or the like. FIGURE 4 shows clearly that a boat 125 can be carried within the trailer by opening the door 113 and inserting the boat therethrough.

Each side wall of the lower section "A" of the trailer is permanently closed by side walls 130 extending between hollow posts "P" arranged at the front and rear of the floor portion "L," and between the horizontal base frame 20 and the horizontal top rails "T." Each side wall 130 has an auxiliary wall 132 of substantially the same size, hinged along its upper edge portion, adjacent top rail "T," so as to be folded outwardly of the trailer and retained vertically and parallel therewith when the roof is in lowermost position; the roof completely seals and/or covers both top edges of the two walls 130 and 132 if in its lowermost position. Each diverging forward portion of the trailer has a side wall 135 closing the same between the side walls 130 and the front wall 42 of the trailer, and each wall 135 has auxiliary walls 138 hinged along its upper edge portion adjacent horizontal rails "X," so as to be folded outwardly and downwardly parallel to its associated wall 135, said roof also covering both top edges of the two walls 135 and 138 when it is in its lowermost position. The front end of the lower section "A" is closed by a panel, or wall 42, which also has an auxiliary door 140, said door 140 having a removable window 162 therein, said door hinged along the top rail "Z," so as to be folded inwardly whereby it is retained in a horizontal position, the roof overlapping the top edge portion of panel 42 and said rail "Z" to seal against rain or the like. During time of camping, and the roof in raised position, the opening usually closed by panel 140, is closed by a screen or the like, the said panel 140 is lowered to a horizontal position resting upon the platform 160 built within the forward end of the trailer and supported on rails W, X, and Z, the lowering of the window 162 forms a means of ventilation to the interior of the trailer.

Directly above the door 140, when it is in said horizontal position, is located a water supply tank 142 rigidly secured in the cavity between said ceiling 105 and roof of the roof 106 portion "B"; said tank 142 is ahead of the compartment needed by the auxiliary rear door 116 when stored between the ceiling and the roof. A water filler inlet pipe 150 extends from the tank 142 upwardly through the roof 106 whereby the tank can be filled just before camping, or during camping. The water tank 142 has an outlet pipe 143 in the bottom panel thereof, said pipe having a valve 144 for controling the flow of water therethrough; a hose or the like is generally attached at one end to said valve 144, leaving the opposite end free to direct water where needed within the trailer.

From the above it is seen that the trailer can be used as a boat carrier assembly and also used as a temporary shelter, for sleeping quarters, for serving lunches, for keeping temporarily out of inclement weather, the roof easily raised by a single person by turning a single crank at the forward end of the trailer and outside thereof. The auxiliary rear upper door can be easily lowered or inserted with the cavity provided in the roof section by a single party. The auxiliary side and forward diverging panels may be lowered and secured in lowermost position by resilient angular brackets or the like, as shown in my issued Patent No. 2,926,947, granted March 1, 1960. The generic invention of traveling with lowered auxiliary walls is disclosed by my said issued patent; however, the method and means of raising the roof is deemed novel combined with novel trailer structure.

It will be understood that modifications and variations may be effected without departing from the scope of the novel concepts of the present invention.

I claim as my invention:

A portable trailer house comprising a lower body section, said lower body section having a front portion of trapezoidal floor area and a rear portion of rectangular floor area, a roof section, auxiliary walls hingedly carried by said lower body section, a pair of wheels mounted upon an axle carried by said rear portion, a single caster wheel resiliently mounted in conjunction with telescoping means at the forward end of said front portion, said auxiliary walls when arranged in an upwardly, vertical position forming an upper body section, said lower body section having a transverse front wall and a pair of longitudinal side walls, said lower body section having a rear door opening across the entire rear end thereof, a rear lower door arranged in said door opening and hingedly supported along one vertical end portion thereof whereby it may be swung outwardly and radially in a horizontal plane leaving said door opening unobstructed, a pair of horizontal longitudinal shafts disposed one along each of said side walls, stationary bearings for said longtiudinal shafts fixed to said side walls adjacent the upper edge portions thereof, four perforated thrust plates, one thrust plate secured in each corner of said rear portion, four stationary hollow vertical posts each having a vertical slot, one post disposed adjacent each end of said longitudinal side walls and in one of said thrust plates and the lower end of each of said posts extending a short distance below said thrust plate and the trailer house floor, four square extension members with toothed racks, one extension member with the toothed rack movably supported vertically within each of said hollow posts, said extension member being substantially the same length as said hollow posts, each extension member having a longitudinal bore square in cross section, a pair of pinion gears fixed to each of said longitudinal shafts and meshing with said toothed racks on said extension member, said roof section supported upon the upper ends of said extension members with said toothed racks, and crank means carried adjacent the forward end of said lower body section operatively connected with the forward ends of said longitudinal shafts for effecting the rotation of the latter whereby said roof section may be raised and lowered relative to said lower section by raising and lowering said extension members with said toothed racks, and when said roof is in the uppermost position thereby forming a roof for both said upper and lower sections, and when said roof section is in the lowermost position it rests upon the upper ends of said hollow posts as said extension members are enclosed within said posts, and said roof section comprising a flat horizontal roof portion and a ceiling portion vertically spaced from each other forming a compartment therebetween, a flat one piece auxiliary rear door horizontally stored within said compartment upon transverve rollers arranged therein, said auxiliary door having angle members secured with its top edge portion, a hinged closure door arranged transversely of said roof section for closing the rear end of said compartment, a transverse rib at the rear of said compartment for suspending said auxiliary door by said angle members in a vertical position outside thereof, said auxiliary door extending between said hinged closure door and said rear lower door when said roof is in uppermost position and said door withdrawn from said compartment and depending from said rib.

References Cited in the file of this patent

UNITED STATES PATENTS

| | | |
|---|---|---|
| 2,292,107 | Doepke | Aug. 4, 1942 |
| 2,569,641 | Metherell | Oct. 2, 1951 |
| 2,581,556 | Rogers | Jan. 8, 1952 |
| 2,704,223 | Houdart | Mar. 15, 1955 |
| 2,739,833 | Schenkel | Mar. 27, 1956 |
| 2,749,174 | Medford | June 5, 1956 |
| 2,767,013 | Spears | Oct. 16, 1956 |
| 2,819,114 | Lake | Jan. 7, 1958 |
| 2,842,972 | Houdart | July 15, 1958 |
| 2,879,103 | Hall | Mar. 24, 1959 |

FOREIGN PATENTS

| | | |
|---|---|---|
| 106,933 | Australia | May 5, 1938 |
| 250,506 | Germany | Nov. 30, 1911 |